(12) United States Patent
Stauber

(10) Patent No.: US 10,703,568 B2
(45) Date of Patent: Jul. 7, 2020

(54) CARRIAGE FOR A RAIL-GUIDED CONVEYING SYSTEM AND CONVEYING SYSTEM COMPRISING SUCH A CARRIAGE

(71) Applicant: FERAG AG, Hinwil (CH)

(72) Inventor: Erwin Stauber, Grüt (CH)

(73) Assignee: FERAG AG, Hinwil (CH)

( * ) Notice: Subject to any disclaimer, the term of this patent is extended or adjusted under 35 U.S.C. 154(b) by 344 days.

(21) Appl. No.: 15/605,544

(22) Filed: May 25, 2017

(65) Prior Publication Data

US 2017/0341864 A1    Nov. 30, 2017

(30) Foreign Application Priority Data

May 31, 2016   (CH) ........................................ 694/16

(51) Int. Cl.
*B65G 9/00*     (2006.01)
*B61B 3/00*     (2006.01)

(52) U.S. Cl.
CPC ............... *B65G 9/002* (2013.01); *B61B 3/00* (2013.01); *B65G 2812/182* (2013.01)

(58) Field of Classification Search
CPC .. B61B 3/00; B61B 3/02; B61B 10/00; B61B 10/02
See application file for complete search history.

(56) References Cited

U.S. PATENT DOCUMENTS

| | | |
|---|---|---|
| 474,973 A | 5/1892 | Sadd |
| 3,694,018 A | 9/1972 | Levering |
| 3,982,623 A | 9/1976 | DePas et al. |
| 4,946,023 A | 8/1990 | Heinold et al. |
| 5,269,402 A | 12/1993 | Speckhart et al. |
| 5,280,895 A | 1/1994 | Meier |
| 5,647,475 A | 7/1997 | Gaertner |
| 5,788,054 A | 8/1998 | Janzen et al. |
| 5,975,279 A | 11/1999 | Blattner et al. |
| 6,003,859 A | 12/1999 | Reist |
| 6,139,252 A | 10/2000 | Honegger |

(Continued)

FOREIGN PATENT DOCUMENTS

| | | |
|---|---|---|
| CH | 710 022 A1 | 2/2016 |
| CN | 103538608 A | 1/2014 |

(Continued)

OTHER PUBLICATIONS

Co-pending U.S. Appl. No. 15/553,469, "Feeding Device of an Intra-Logistics System," filed Aug. 24, 2017.

(Continued)

*Primary Examiner* — Robert J McCarry, Jr.
(74) *Attorney, Agent, or Firm* — Pauley Erickson & Kottis

(57) ABSTRACT

A carriage for a rail-guided conveying system, in particular a gravity conveyor, in which a plurality of similar carriages are mounted one behind the other in the rail-longitudinal direction and displaceable in the rail-longitudinal direction, on a running rail extending in the rail-longitudinal direction. A first and a second set of upright rollers are arranged one behind the other for guiding the running rail in the rail-longitudinal direction and which in each case are rotatably mounted on a carriage body transversely to the rail-longitudinal direction about an associated axis and are spaced apart from one another along the associated axis.

13 Claims, 6 Drawing Sheets

(56) References Cited

U.S. PATENT DOCUMENTS

| | | | |
|---|---|---|---|
| 6,199,682 | B1 | 3/2001 | Matkovich |
| 6,415,907 | B1 | 7/2002 | Matkovich |
| 6,971,501 | B2 | 12/2005 | Beyer |
| 2009/0263226 | A1 | 10/2009 | Ramsey |
| 2012/0125221 | A1* | 5/2012 | Gustaffson ............ B61B 13/04 104/89 |

FOREIGN PATENT DOCUMENTS

| | | |
|---|---|---|
| DE | 247498 C | 1/1911 |
| DE | 1 875 012 | 7/1963 |
| DE | 77 15 547 U1 | 8/1978 |
| DE | 29 02 724 A1 | 8/1980 |
| DE | 86 04 435 U1 | 4/1986 |
| DE | 38 19 102 C1 | 10/1989 |
| DE | 41 17 991 A1 | 12/1992 |
| DE | 43 26 095 C1 | 1/1995 |
| DE | 198 29 484 C1 | 11/1999 |
| DE | 20 2006 001 607 U1 | 7/2007 |
| DE | 10 2006 056 943 A1 | 6/2008 |
| DE | 10 2008 057 630 A1 | 5/2010 |
| DE | 10 2009 021 382 A1 | 11/2010 |
| DE | 10 2012 015 040 A1 | 5/2014 |
| EP | 0 511 159 A1 | 10/1992 |
| EP | 0 802 133 A2 | 10/1997 |
| EP | 0 827 929 A1 | 3/1998 |
| EP | 0 856 480 A1 | 8/1998 |
| EP | 1 299 298 B1 | 4/2003 |
| EP | 2 107 023 A1 | 10/2007 |
| EP | 1 914 182 A1 | 4/2008 |
| EP | 2 692 667 A1 | 2/2014 |
| EP | 2 784 009 A1 | 10/2014 |
| GB | 788799 | 1/1958 |
| WO | WO 98/03419 A1 | 1/1998 |
| WO | WO 02/36474 A1 | 5/2002 |
| WO | WO 2013/159238 A1 | 10/2013 |
| WO | WO 2016/030274 A1 | 3/2016 |
| WO | WO 2016/030275 A1 | 3/2016 |

OTHER PUBLICATIONS

Co-pending U.S. Appl. No. 15/553,490, "Transport Unit of an Overhead Conveyor System, Having a Buffer Element," filed Aug. 24, 2017.

Co-pending U.S. Appl. No. 15/797,917, "Transfer Device for Product Carriers With Holding Arms," filed Oct. 30, 2017.

Chinese Patent Office, "Notice of First Office Action," for Chinese Patent Application 201710385863.9, dated Nov. 21, 2019, Beijing, China.

* cited by examiner

CARRIAGE FOR A RAIL-GUIDED CONVEYING SYSTEM AND CONVEYING SYSTEM COMPRISING SUCH A CARRIAGE

CROSS-REFERENCE TO RELATED APPLICATIONS

Swiss Patent Application 00694/16, filed 31 May 2016, the priority document corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to the field of conveyor technology. It relates to a carriage for a rail-guided conveying system.

The invention further relates to a conveying system comprising such a carriage.

Discussion of Related Art

In the production and post-treatment of goods, and also when order picking and packing, the automated conveyance of goods plays an important role. Gravity conveyors, in particular gravity-type suspended conveying systems, are characterized amongst other things in that they permit the conveyance of goods to be repositioned from the floor into otherwise unused areas inside or outside buildings. Frequently, therefore, suspended conveying systems are fastened overhead on supports which are attached to the ceiling, walls or individually to pillars fastened to the floor.

Suspended conveying systems are additionally used as buffers between two or more operating processes at different speeds. As a result, networked processes may be uncoupled in terms of time and/or space, whereby for example interruptions to the processes may be eliminated without having to halt the remaining parts of a process chain. Similarly differences in the processing cycle times may be absorbed thereby.

In many fields, gravity-type suspended conveyors are suitable, in particular, for creating buffers. This is due, on the one hand, to the aforementioned improved use of space. On the other hand, they are relatively energy-saving since they do not require any drive means, such as for example drive chains guided along the running rails, in contrast for example to actively conveyed suspended conveying systems, and generally they only have a few short actively conveyed sections. As a result, gravity-type suspended conveyors may also be reduced in size or increased in size in a relatively simple and cost-effective manner, specifically for changed production requirements.

For the safe operation of gravity-type suspended conveyors it is important that the transport bodies used (also called shuttles) have consistently good running properties. In particular, it has to be ensured that the transport bodies are not braked inadvertently, or even come to a standstill, on gravity-conveyed track sections since this would lead to delays or interruptions in the conveying process. Therefore, carriages with wheels or rollers are generally used as transport bodies for gravity-type suspended conveyors, since generally they have a lower kinetic resistance than those with so-called runners which in turn have a kinetic resistance which is speed-dependent.

A carriage for a conveyor is disclosed in the publication WO 2016/030275 A1 of the applicant, said carriage comprising a carriage body which is configured for encompassing a running rail and which comprises a first and a second leg which are connected by a connecting portion, wherein the first leg has first rollers attached to its inner face and the second leg has second rollers attached to its inner face and the connecting portion has third rollers attached to its inner face. The first and second rollers in this case are arranged upright and the third rollers horizontally.

By means of the known solution, a carriage which is safer in terms of running is provided, in particular for a gravity conveying system. Such a carriage is suitable for goods of different dimensions and/or weights as well as for conveying distances which have almost any path. Such a carriage may also be produced for a relatively low unit price. Finally, a conveying system which is more functionally reliable and simple, in particular a gravity conveying system, may be implemented by the carriage of WO 2016/030275 A1.

The carriage disclosed in WO 2016/030275 A1, with its roller pairs arranged one behind the other in the direction of travel and the associated U-shaped carriage body, has a length in the direction of travel which adds up to a significant overall length of the series of carriages when a plurality of similar carriages are arranged in close succession one behind the other in the conveying system. As a result, when a plurality of carriages are used in the system a considerable rail length of the running rails is occupied, leading to an increased extent of the rail system.

Moreover, when for example individual goods suspended on the carriages are transported or stored, said goods having an extent in the direction of travel which is significantly less than the length of the carriage (for example T-shirts, flat printed products, or the like), during transport or during storage in the conveying system only a limited density per unit of the rail length is achieved, which is primarily determined by the length of the carriage in the direction of travel.

In EP 0 856 480 A1, a rail-guided transport means is proposed, in particular for conveying printed products, said transport means comprising a transport means body with two legs, which on the sides assigned to one another in each case comprise two sliding or rolling means arranged offset diametrically opposed in a crosswise manner, wherein the sliding or rolling means are arranged mutually spaced apart from one another in the direction of travel of the legs, such that a guide rail is located between the sliding or rolling means.

This transport means and a transport system equipped thereby are intended to be more advantageous economically, compared to previously known transport means which are of relatively large and heavy design and thus have the drawback that the printed products are conveyable at a lower speed and that the printed products have a relatively large mutual spacing in the conveying stream and thus limit the conveying capacity of the transport system.

As may be identified, however, from the figures of EP 0 856 480 A1, the denser packing of the transport means is primarily achieved by the extent of the transport means being drastically reduced in the direction of transport and the rollers arranged one behind the other in the direction of travel being moved as close as possible to one another. Additionally, according to FIG. 6 of EP 0 856 480 A1 a slight nesting of the transport means is achieved.

SUMMARY OF THE INVENTION

It is, therefore, the object of the invention to provide a carriage and an associated conveying system which permit a significantly greater packing density of the carriages in a series of carriages, without disadvantages in the running stability and rail guidance.

The carriage according to the invention is provided for a rail-guided conveying system, in particular a gravity conveyor, in which conveying system a plurality of similar carriages are mounted one behind the other in the rail longitudinal direction and displaceably in the rail longitudinal direction, on a running rail extending in a rail longitudinal direction, wherein the carriage has a first and a second set of upright rollers which are arranged one behind the other for guiding in the running rail in the rail longitudinal direction and which in each case are rotatably mounted on a carriage body transversely to the rail longitudinal direction about an associated axis and are spaced apart from one another along the associated axis.

The carriage is characterised in that the internal spacing of the rollers in the first set of rollers is greater by a predetermined amount than the external spacing of the rollers in the second set of rollers and that the mounting of the first and second roller pairs on the carriage body is configured such that two successive carriages may be pushed into one another in a space-saving manner. In this case, the second set of rollers of the one carriage comes to rest between the rollers of the first set of rollers of the other carriage.

By this type of arrangement of rollers, a nesting of adjacent carriages may be achieved without considering the spacing of the sets of rollers, which permits a significantly higher packing density with greater stability of the carriages.

In the simplest case, the sets of rollers in each case form a roller pair. However, it is also conceivable to provide sets of rollers with more than two rollers per set, in particular with a plurality of roller pairs.

Primarily, a running rail as is disclosed in WO 2016/030274 A1 of the applicant is considered as a suitable running rail. The disclosure of this application forms part of the disclosure of the present application.

One embodiment of the carriage according to the invention is characterized in that the carriage body is configured for encompassing the running rail and comprises a first and a second leg which are spaced apart from one another transversely to the rail longitudinal direction and are connected together by a connecting portion, and in that the rollers of the first set of rollers in each case are rotatably arranged on the inner face of the legs.

In particular, first support brackets are configured, in particular integrally formed, on the inner faces of the legs adjacent to the rollers of the first set of rollers, deviating inwardly beyond the rollers of the first set of rollers and being bent back in the rail longitudinal direction, the rollers of the second set of rollers being rotatably arranged on the free ends thereof.

According to a further embodiment, the rollers of the first and second set of rollers may be arranged mirror-symmetrically to a vertical plane of symmetry of the carriage.

Moreover, the carriage may comprise a third set of rollers with a first and second horizontal roller, wherein the horizontal rollers of the third set of rollers are arranged one behind the other on the inner face of the connecting portion in the rail longitudinal direction, the axes of the rollers of the third set of rollers are located in the vertical plane of symmetry of the carriage and the first horizontal roller is arranged higher by a predetermined amount than the second horizontal roller, so that when two successive carriages are pushed into one another in a space-saving manner, the first horizontal roller of the one carriage comes to rest above the second horizontal roller of the other carriage.

In particular, the second horizontal roller may be rotatably arranged directly on the upper face of the connecting portion, wherein the first horizontal roller is rotatably arranged on the free end of a second support bracket which is configured, in particular integrally formed, on the inner face of the connecting portion, deviating inwardly beyond the second roller and being bent back in the rail longitudinal direction.

A further embodiment of the carriage according to the invention is characterized in that a fastening portion is provided on the carriage body.

Goods to be conveyed may be releasably fastened to this fastening portion.

A further embodiment of the carriage according to the invention is characterized in that the rollers of the first set of rollers are configured as a roller body injection-molded around a ball bearing.

In particular, the rollers of the first set of rollers may be wider than the rollers of the second set of rollers.

Additionally, in particular, a pin-shaped coupling element may be arranged so as to protrude outwardly from the first and second legs of the carriage body in each case transversely to the rail longitudinal direction, an external element being able to be engaged thereby on the carriage.

According to a further embodiment of the invention the carriage body is configured in one piece.

The conveying system according to the invention comprises at least one carriage according to the invention and at least one running rail adapted to the carriage.

As already mentioned, this running rail may be configured as disclosed in WO 2016/030274 A1 of the applicant.

BRIEF DESCRIPTION OF SEVERAL VIEWS OF THE DRAWINGS

The invention is intended to be described in more detail hereinafter with reference to exemplary embodiments in connection with the drawings, in which.

DESCRIPTION OF PREFERRED EMBODIMENTS

Figure 1:
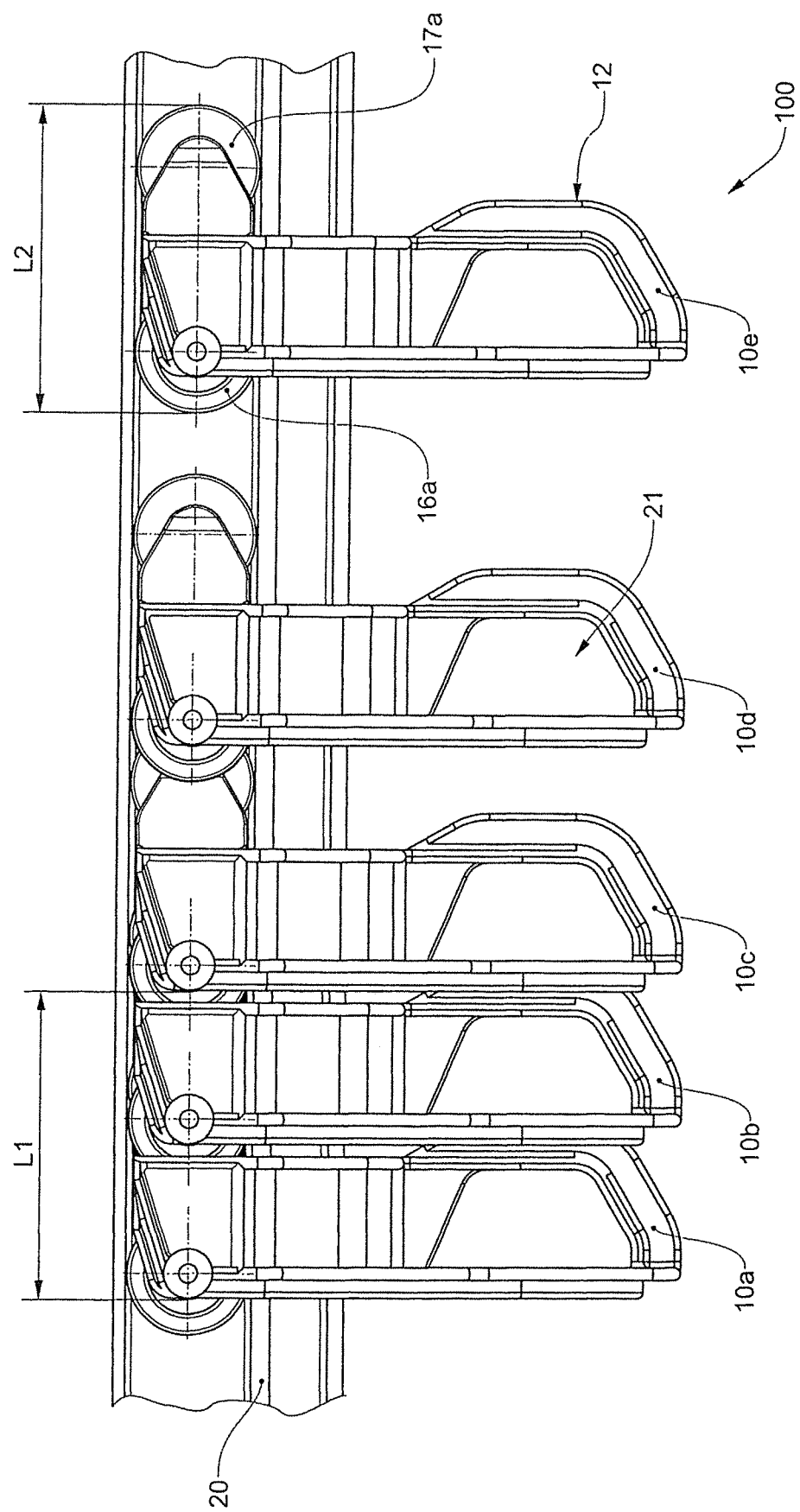
FIG. 1 shows in a side view a portion of a running rail of a conveying system according to an exemplary embodiment of the invention with a plurality of carriages which are pushed together, increasing to the left to form a maximum dense sequence.
Figure 2:
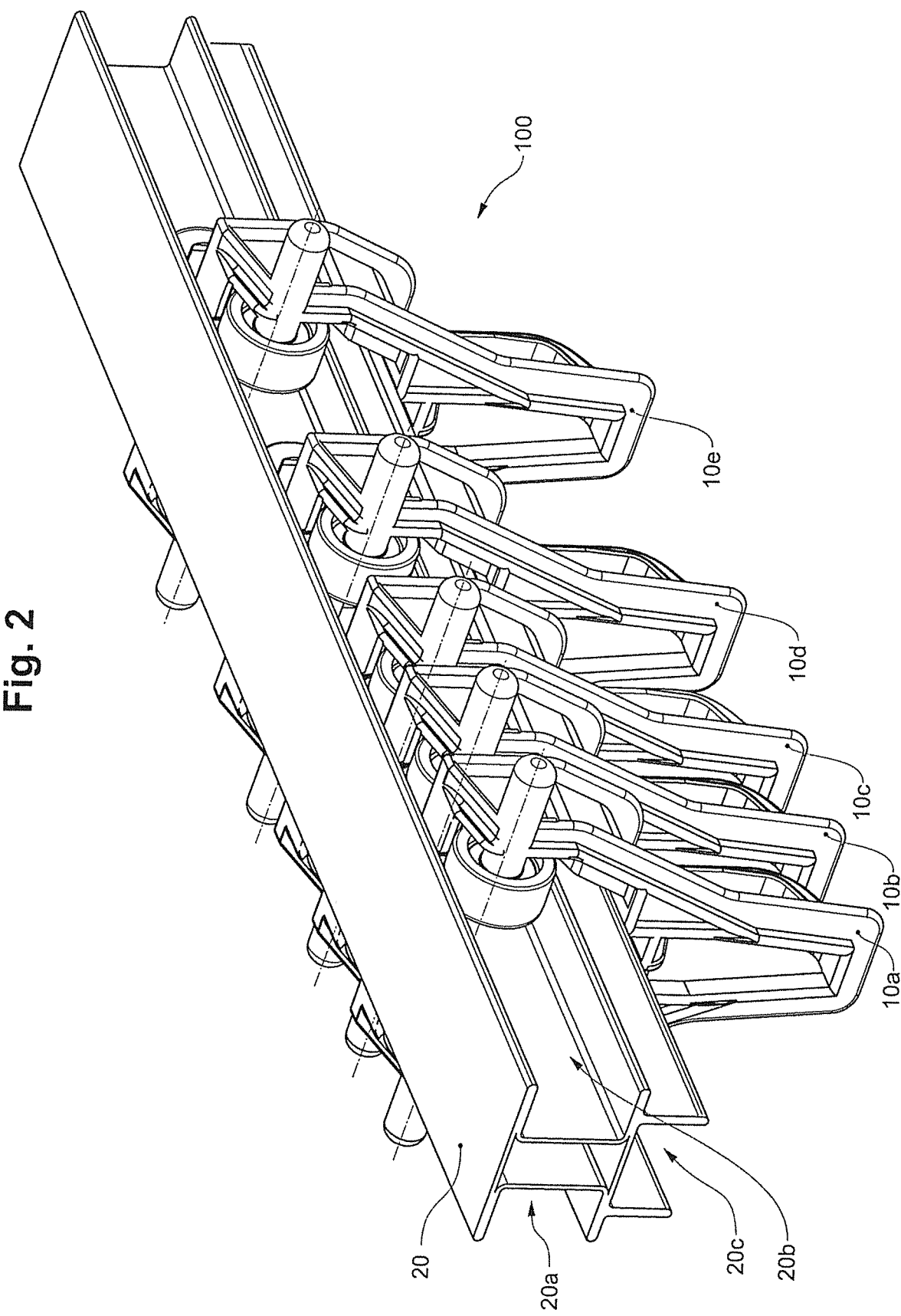
FIG. 2 shows the configuration of FIG. 1 in a perspective view which, in particular, discloses the cross-sectional profile of the running rail.
Figure 3:
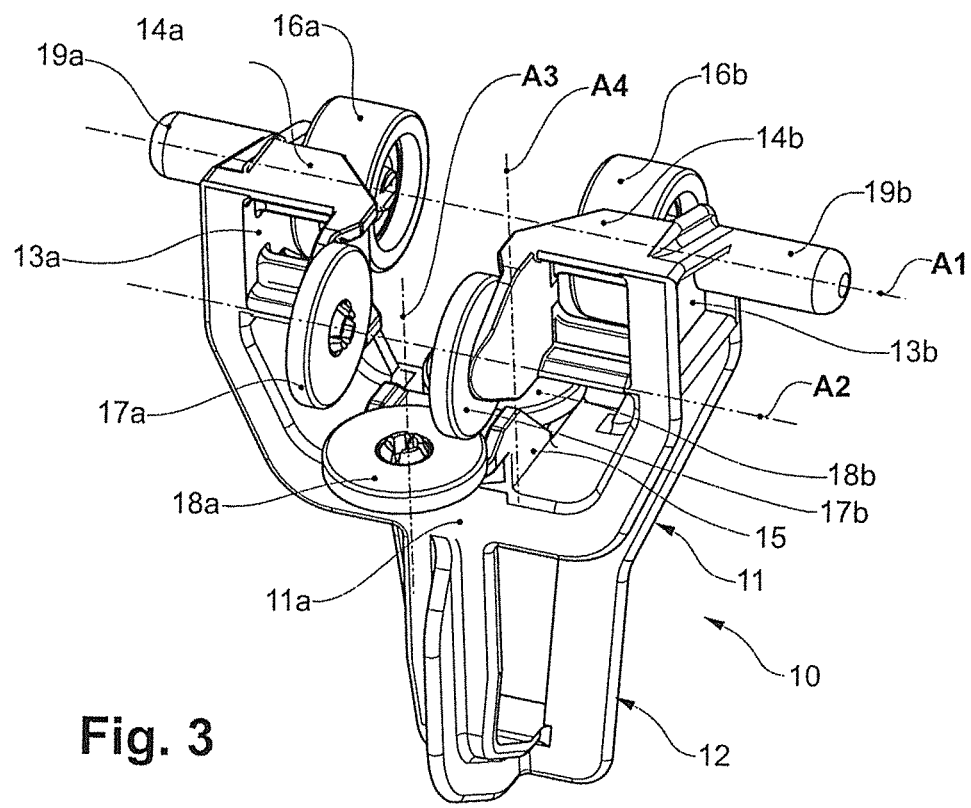
FIG. 3 shows an exemplary embodiment of a carriage according to the invention in a view obliquely from above.
Figure 4:
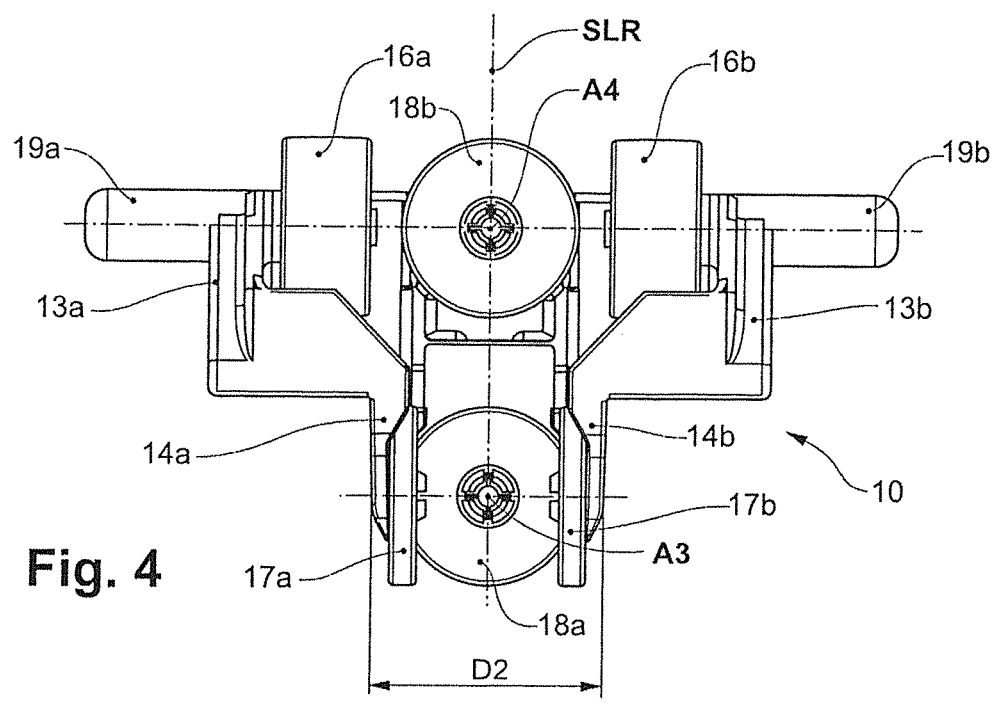
FIG. 4 shows a plan view from above of the carriage of FIG. 3.
Figure 5:
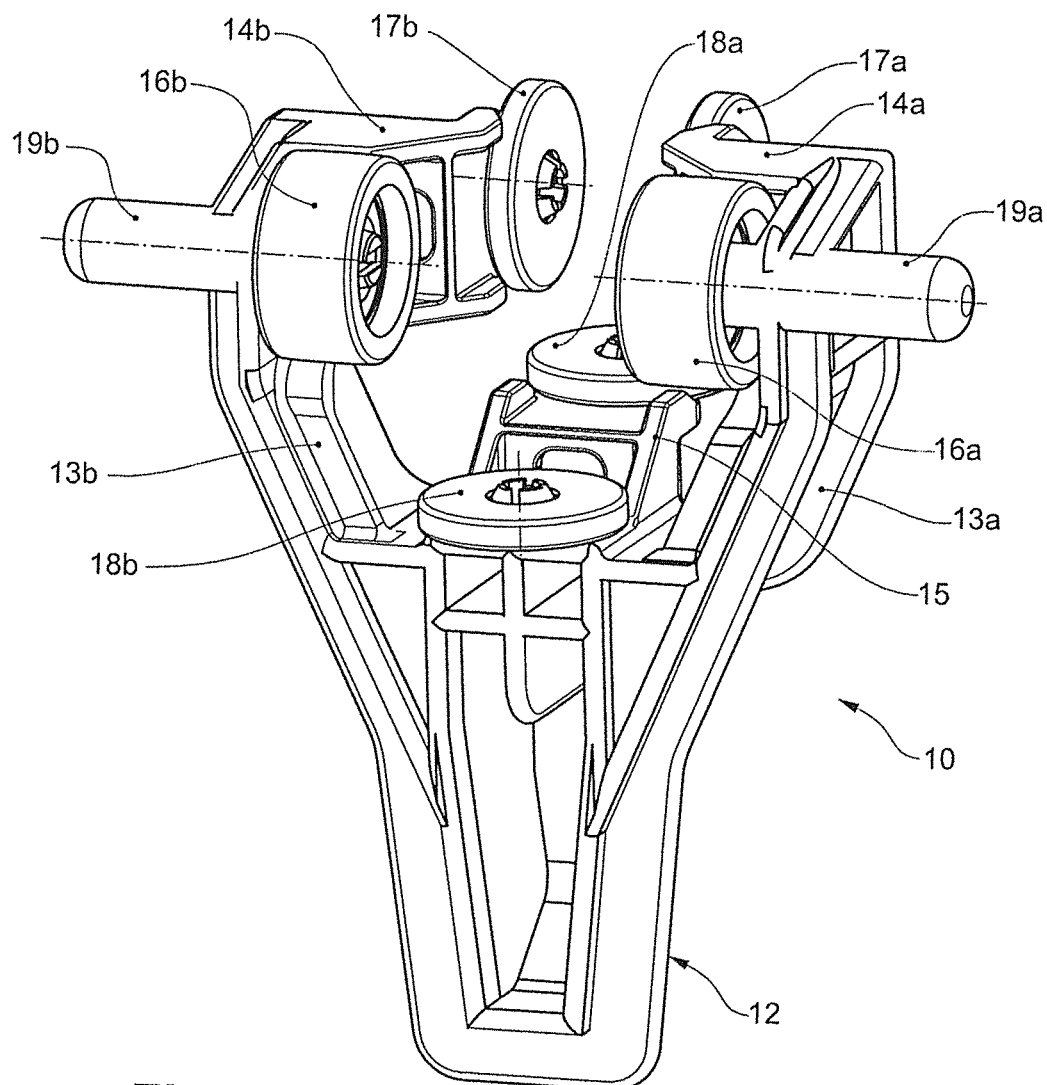
FIG. 5 shows a perspective view of the carriage of FIG. 3 from the opposing direction.
Figure 6:
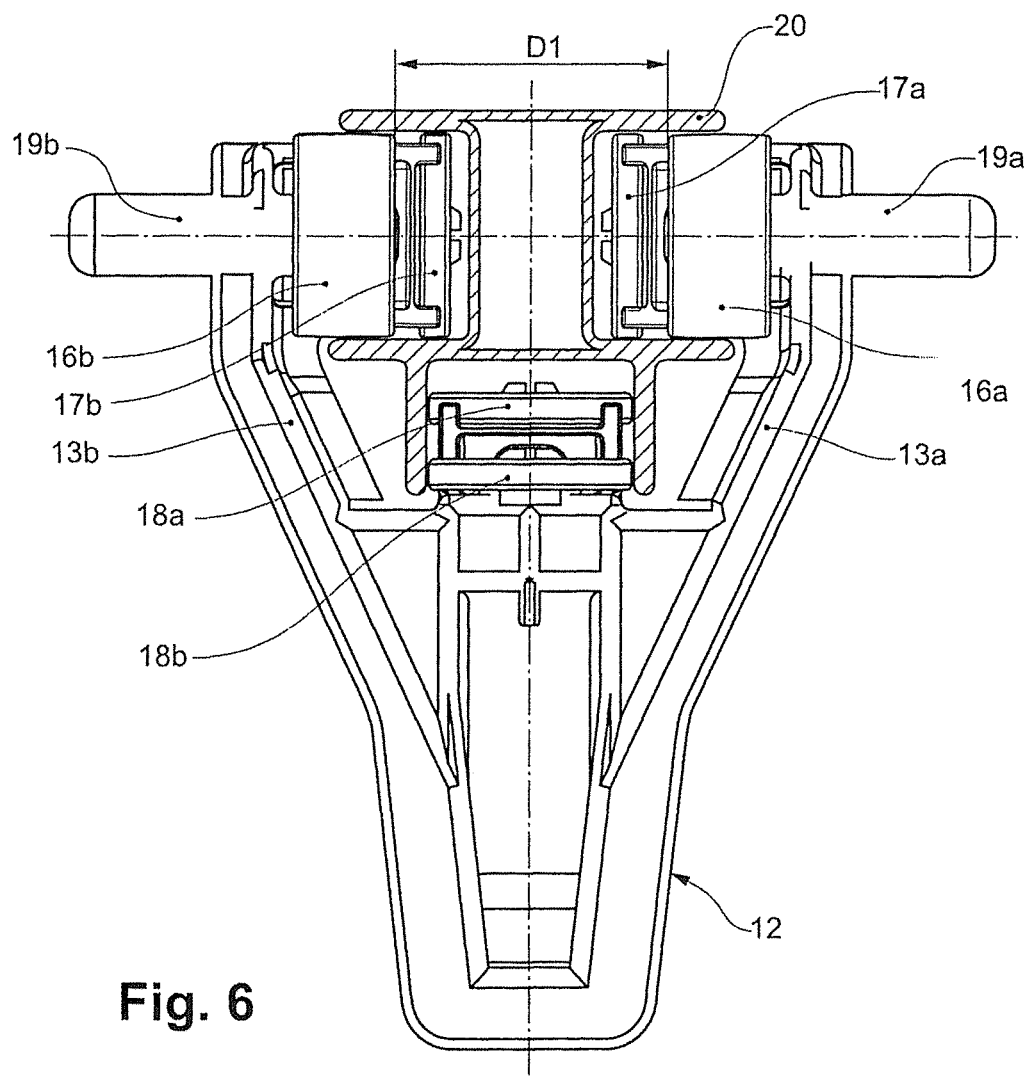
FIG. 6 shows a view of the carriage of FIG. 3 in the direction of travel.

In FIG. 1 and FIG. 2 a detail of a conveying system and/or conveyor 100 according to an exemplary embodiment of the invention is reproduced in a side view (FIG. 1) and a perspective view obliquely from above (FIG. 2). The figures show a portion of a running rail 20 which extends in a linear manner in a rail longitudinal direction and which comprises two opposing lateral, outwardly open U-shaped guide channels 20a and 20b as well as a central downwardly open U-shaped guide channel 20c. The guide channels 20a, 20b and 20c extend parallel in the rail longitudinal direction (further details relating to the running rail may be derived from WO 2016/030274 A1).

Displaceably mounted on the running rail 20 in the rail longitudinal direction are a plurality of similar carriages 10a-e, the left three carriages 10a, 10b and 10c thereof being shown nested in one another at a maximum density, whilst the remaining carriages 10d and 10e are not nested and are freely movable with sufficient space relative to one another. From FIG. 1 by comparing the carriages 10a-c with the carriage 10d or 10e it may be derived that in the nested arrangement two carriages take up approximately the same length L1 in the direction of travel as the length of an individual carriage (length L2). Relative to the configuration disclosed in WO 2016/030275 A1, therefore, for the exemplary embodiment shown here this results in an increase in the packing density for the carriage by a factor of 2.

Figure 7:
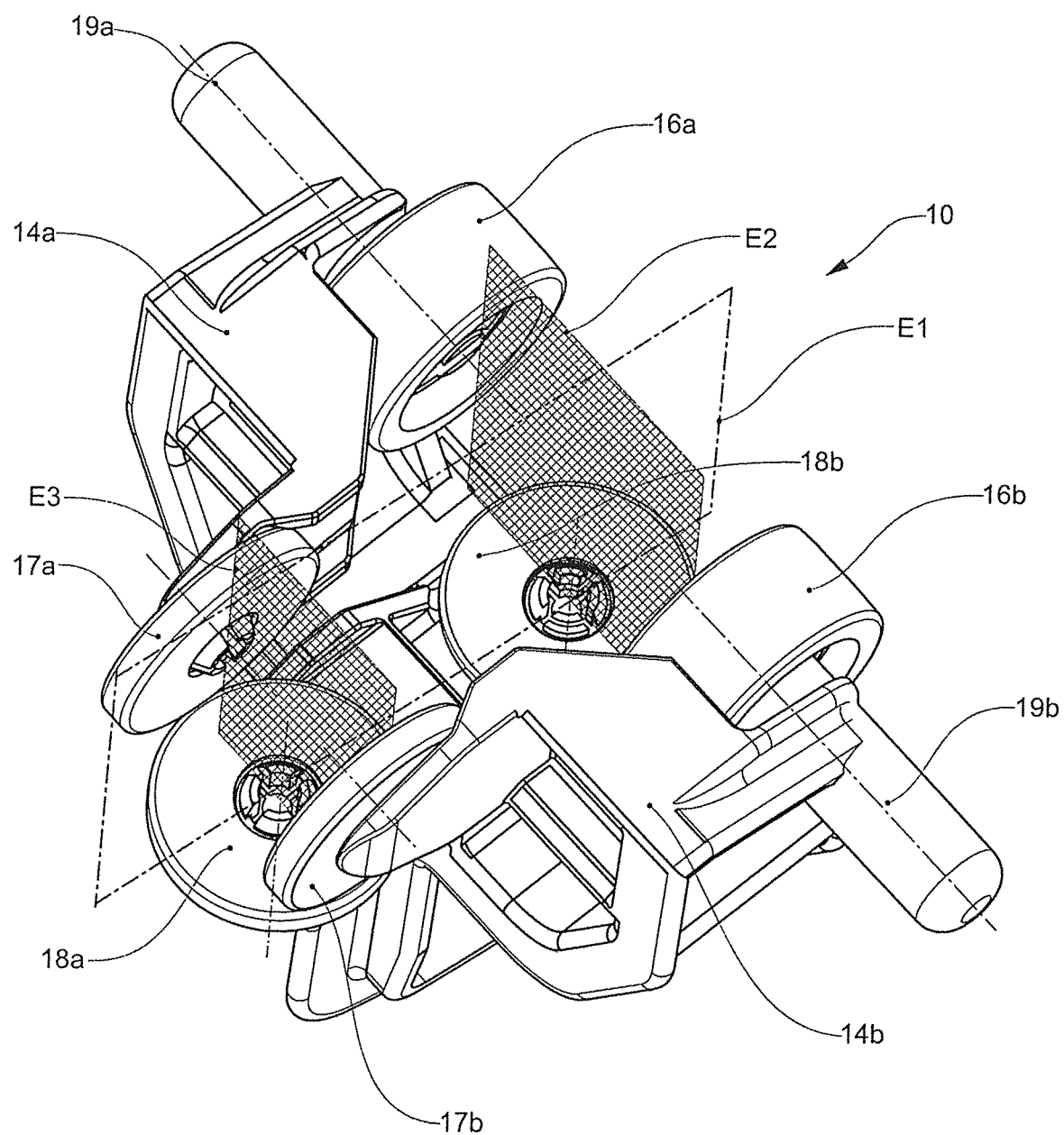
FIG. 7 shows a perspective view of the carriage of FIG. 3 with the illustrated planes for the sets of rollers and the illustrated plane of symmetry.

The construction of an individual carriage 10 according to the exemplary embodiment is revealed from FIGS. 3-7. The carriage 10 constructed symmetrically to a vertical plane of symmetry (E1 in FIG. 7) for guiding in the running rail 20 and for absorbing and introducing the load in the running rail 20 has a first and a second set of rollers 16a, 16b and/or 17a, 17b arranged one behind the other in the rail longitudinal direction SLR, which in the example are configured as pairs. The first set of rollers 16a, 16b is arranged in a first vertical plane E2 oriented perpendicular to the direction of travel (FIG. 7). The second set of rollers 17a, 17b is arranged in a second vertical plane E3 (FIG. 7) oriented perpendicular to the direction of travel.

The rollers 16a, b and 17a, b are rotatably mounted on a carriage body 11 encompassing from below the running rail 20, in each case transversely to the rail longitudinal direction in the planes E2 and E3 about an associated axis (A1 and/or A2) and spaced apart from one another along the associated axis (A1 and/or A2). The internal spacing (D1 in FIG. 6) of the rollers 16a, b in the first set of rollers is greater by a predetermined amount than the external spacing (D2 in FIG. 4) of the rollers 17a, b in the second set of rollers. This amount is selected such that the second set of rollers 17a, b of an adjacent carriage may be received between the rollers 16a, b of the first set of rollers. In order to permit this, the mounting of the first and second sets of rollers 16a, b and/or 17a, b on the carriage body 11 is configured such that two successive carriages (for example the carriages 10a and 10b in FIG. 1) may be pushed into one another in a space-saving manner, by the second set of rollers 17a, b of the one carriage 10a coming to rest between the first set of rollers 16a, b of the further carriage 10b.

The carriage body 11 which—as already mentioned—is configured for encompassing the running rail 20, has a first and second leg 13a and 13b. The two legs are spaced apart from one another transversely to the rail longitudinal axis and/or rail longitudinal direction and connected together by a connecting portion 11a. The rollers 16a, b of the first set of rollers in this case are respectively arranged rotatably on the inner face of the legs 13a, b.

The rollers 16a, b of the first set of rollers, which due to the geometry of the carriage body 11 receive the greatest part of the load, are by a multiple wider than the rollers 17a, b of the second set of rollers. In particular, the rollers 16a, b of the first set of rollers are mounted by ball bearings, preferably configured as a roller body injection molded around a ball bearing. The rollers 17a, b of the second set of rollers are accordingly designed as narrow wheels which are rotatably mounted on an axle without specific bearing means.

So that the rollers 17a, b of the second set of rollers in each case may be arranged offset inwardly compared to the rollers 16a b of the first set of rollers, first support brackets 14a, b are configured, in particular integrally formed, on the inner faces of the legs 13a, b adjacent to the rollers 16a, b of the first set of rollers, deviating inwardly beyond the rollers 16a, b of the first set of rollers and being angled back in the rail longitudinal direction SLR, the rollers 17a, b of the second set of rollers being rotatably arranged on the free ends thereof on the inner face.

Whilst the carriage 10 comprising the rollers 16a, b of the first set of rollers and the rollers 17a, b of the second set of rollers is mounted and runs in the lateral guide channels 20a and 20b of the running rail 20, a third set of rollers with a first and second horizontal roller 18a and 18b is provided on the carriage 10 and is received by the lower guide channel 20c of the running rail 20. The horizontal rollers 18a, b of the third roller set, which are also configured as narrow wheels, are arranged one behind the other on the inner face of the connecting portion 11a in the rail longitudinal direction SLR. The axes A3 and A4 of the rollers 18a, b of the third set of rollers are preferably located in the vertical plane of symmetry E1, the rollers 16a, b and 17a, b of the first and second sets of rollers also being arranged mirror-symmetrically thereto. The axes A3 and A4 of the rollers 18a, b of the third set of rollers, however, may also be located obliquely to the plane of symmetry E1 for influencing the running behavior, in particular for the purposes of self-centering.

The first horizontal roller 18a is arranged higher by a predetermined amount than the second horizontal roller 18b so that when two successive carriages, such as for example the carriages 10a and 10b, are pushed into one another in a space-saving manner, the first horizontal roller 18a of the one carriage 10a comes to rest above the second horizontal roller 18b of the other carriage 10b.

In order to achieve the described stepped arrangement vertically, the second horizontal roller 18b is rotatably arranged directly on the upper face of the connecting portion 11a, whilst the first horizontal roller 18a is rotatably arranged on the free end of a second support bracket 15 which is configured, in particular integrally formed, on the inner face of the connecting portion 11a, deviating inwardly beyond the second horizontal roller 18b and being angled back in the rail longitudinal direction SLR.

So that corresponding goods suspended on the carriage 10 may be transported, deviating downwardly from the connecting portion 11a, a fastening portion 12 in the form of a lug and/or an eye 21 is provided on the carriage body 11, goods to be conveyed being able to be releasably fastened, for example hooked, thereto. If an item is suspended in the lug, due to the shape of the lug 21 it automatically slips into the lowest position which is located below the rollers 16a, b of the first set of rollers so that it is ensured that a load is directly introduced into these rollers.

So that the carriage 10 running in the running rail 20 is able to be mechanically influenced from outside or is able to exert mechanical influence outwardly, in particular, a pin-shaped coupling element 19a and/or 19b is arranged protruding outwardly from the first and second legs 13a and 13b in each case transversely to the rail longitudinal direction SLR, an external element being able to be engaged on the carriage 10 thereby. Other types of coupling elements, however, are also conceivable.

The carriage body 11 is preferably configured as a one-piece, integral cast part and may consist of a suitable plastics or even of metal.

The conveying system constructed with the carriage according to the invention is not only characterized by a functionally safe, low-wear operation, in particular also by means of gravity conveyance, but primarily due to the nesting function of the carriages, permits greater conveying capacity and significantly increased storage density.

I claim:

1. A carriage (10) for a rail-guided conveying system (100), comprising:
a plurality of similar carriages (10a-e) mounted one behind the other in a rail-longitudinal direction and displaceable in the rail-longitudinal direction, on a running rail (20) extending in the rail-longitudinal direction, wherein a carriage (10) of the plurality includes a first and a second set of upright rollers (16a, b; 17a, b) which are arranged one behind the other for guiding in the running rail (20) in the rail longitudinal direction (SLR) and which in each case are rotatably mounted on a carriage body (11) transversely to the rail-longitudinal direction about an associated axis (A1 and/or A2) and are spaced apart from one another, and coaxially relative to each other, along the associated axis (A1 and/or A2), wherein the internal spacing (D1) of the rollers in the first set of rollers (16a, b) is greater by a predetermined amount than the external spacing (D2) of the rollers in the second set of rollers (17a, b) and the mounting of the first and second sets of rollers (16a, b; 17a, b) on the carriage body (11) is configured such that two successive carriages (10a-f) may be pushed into one another in a space-saving manner.

2. The carriage according to claim 1, wherein the carriage body (11) is configured for encompassing the running rail (20) and comprises a first and a second leg (13a, 13b) which are spaced apart from one another transversely to the rail-longitudinal direction and are connected together by a connecting portion (11a), and in that rollers (16a, b) of the first set of rollers in each case are rotatably arranged on the inner face of the legs (13a, b).

3. The carriage according to claim 2, wherein first support brackets (14a, b) are configured, in particular integrally formed, on the inner faces of the legs (13a, b) adjacent to the rollers (16a, b) of the first set of rollers, deviating inwardly beyond the rollers (16a, b) of the first set of rollers and being bent back in the rail longitudinal direction (SLR), rollers (17a, b) of the second set of rollers being rotatably arranged on the free ends thereof.

4. The carriage according to claim 1, wherein rollers (16a, b; 17a, b) of the first and second set of rollers are arranged mirror-symmetrically to a vertical plane of symmetry (E1) of the carriage (10).

5. The carriage according to claim 4, wherein the carriage comprises a third set of rollers with a first and second horizontal roller (18a, b), in that the horizontal rollers (18a, b) of the third set of rollers are arranged one behind the other on an inner face of a connecting portion (11a) in the rail-longitudinal direction (SLR), in that the axes (A3, A4) of the rollers (18a, b) of the third set of rollers are located in the vertical plane of symmetry (E1) of the carriage (10) and in that the first horizontal roller (18a) is arranged higher by a predetermined amount than the second horizontal roller (18b), so that when two successive carriages (10a-f) are pushed into one another in a space-saving manner, the first horizontal roller (18a) of the one carriage comes to rest above the second horizontal roller (18b) of the other carriage.

6. The carriage according to claim 5, wherein the second horizontal roller (18b) is rotatably arranged directly on an upper face of the connecting portion (11a) and in that the first horizontal roller (18a) is rotatably arranged on a free end of a second support bracket (15) which is configured, in particular integrally formed, on the inner face of the connecting portion (11a), deviating inwardly beyond the second horizontal roller (18b) and being bent back in the rail longitudinal direction (SLR).

7. The carriage according to claim 1, wherein a fastening portion (12) is provided on the carriage body (11).

8. The carriage according to claim 1, wherein the rollers of the first set of rollers (16a, b) are configured as a roller body injection-molded around a ball bearing.

9. The carriage according to claim 8, wherein the rollers of the first set of rollers (16a, b) are wider than the rollers of the second set of rollers (17a, b).

10. The carriage according to claim 2, wherein a pin-shaped coupling element (19a, b) is arranged so as to protrude outwardly from the first and second legs (13a, 13b) in each case transversely to the rail longitudinal direction, an external element engageable thereby on the carriage (10).

11. The carriage according to claim 1, wherein the carriage body (11) is configured in one piece.

12. A conveying system comprising at least one carriage (10; 10a-e) according to claim 1, and at least one running rail (20) adapted to the carriage (10; 10a-e).

13. The conveying system of claim 12, comprising a gravity conveyor.

* * * * *